United States Patent Office 3,178,419
Patented Apr. 13, 1965

3,178,419
19-NOR-STEROIDS AND PROCESS FOR THEIR MANUFACTURE
Oskar Jeger and Kurt Schaffner, Zurich, Switzerland, assignors to Ciba Corporation, New York, N.Y., a corporation of Delaware
No Drawing. Filed July 12, 1963, Ser. No. 294,761
Claims priority, application Switzerland, July 18, 1962, 8,677/62
15 Claims. (Cl. 260—239.55)

The present invention provides a new process for the manufacture of 6-oxygenated $\Delta^{5(10)}$-19-norsteroids and of their 5:10-epoxides, as well as of $\Delta^5$-19-norsteroids and $\Delta^4$-19-norsteroids.

According to the present process $\Delta^5$-19-hydroxysteroids are reacted with oxidising heavy-metal acylates in the presence or absence of an acid acceptor, the reaction product is hydrolysed under alkaline conditions and, if desired, in the resulting $\Delta^{5(10)}$-6-hydroxy-19-norsteroids the hydroxyl group is esterified or etherified in known manner, or converted into an oxo group and, if desired, the reaction product is epoxidised in position 5 (10). When the final product is a $\Delta^{5(10)}$-6-oxo-19-norsteroid; it can be converted by Wolff-Kishner method into a $\Delta^{5(6)}$-19-norsteroid and, if desired, after formation of a free 3-oxo group converted into a $\Delta^4$-3-oxo-19-norsteroid.

The reactions according to the invention are illustrated by the example of the partial formulae representing the ring B:

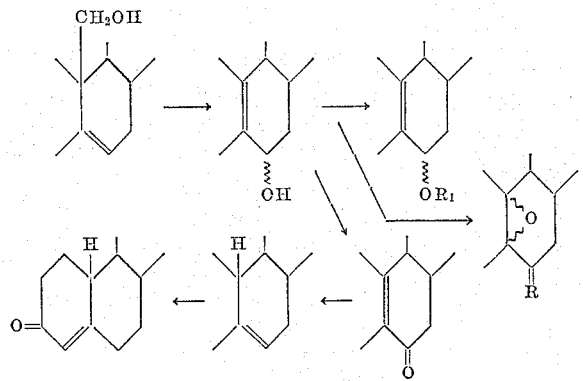

where

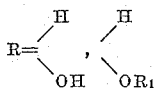

or oxygen, and $R_1$ is an acyl group or a hydrocarbon residue.

Preferred oxidising heavy-metal acylates are the acylates of tetravalent lead, whose acid component is derived from a lower aliphatic, cycloaliphatic, araliphatic or aromatic acid, such as lead tetraacetate, propionate, trimethylacetacetate, hexahydrobenzoate, phenylacetate or benzoate; also silver acylates or mercury acylates.

The reaction with the afore-mentioned heavy-metal acylates consists preferably in heating the starting materials in an inert solvent, for example in an aliphatic, cycloaliphatic and/or aromatic hydrocarbon, such as hexane, heptane, cyclohexane, methyl-cylohexane or benzene, if desired with addition of a week inorganic or organic base, for example an alkaline earth metal carbonate, such as calcium, barium or strontium carbonate, or a tertiary organic base such as pyridine or collidine. The reaction is advantageously performed at a temperature above 60° C., preferably at the boiling point of the individual solvent used. In general the time taken by the reaction depends on the reaction temperature and is on an average 2 to 20 hours.

The subsequent alkaline hydrolysis of the reaction product is carried out, for example, by reaction with an aqueous-alcoholic solution of a bicarbonate, carbonate or hydroxide of an alkali or alkaline earth metal, such as sodium or potassium bicarbonate, sodium, potassium, barium or strontium carbonate or hydroxide, if necessary at an elevated temperature.

The hydroxyl group in the resulting $\Delta^{5(10)}$-6-hydroxy-19-norsteroids can be esterified or etherified in known manner. Suitable esterifying agents are, for example, anhydrides or halides of aliphatic, cycloaliphatic, araliphatic or aromatic carboxylic or sulphonic acids, such as acetic, propionic, trifluoracetic, hexahydrobenzoic, phenylacetic, benzoic, methanesulphonic or para-toluenesulphonic acid. Suitable etherifying agents are, for example, reactively esterified aliphatic or araliphatic alcohols, more especially hydrohalic acid esters or sulphonic acid esters, or tetrahydropyran. The esterification or etherification may, if desired, be carried out in the presence of a base such as pyridine or sodium acetate.

The conversion of the $\Delta^{5(10)}$-6-hydroxysteroids, accessible by the present process, into the corresponding 6-oxo compounds mentioned above is carried out in known manner, for example by treatment with compounds of hexavalent chromium, such as chromium trioxide in pyridine or in sulphuric acid, or with potassium bichromate, also with manganese compounds such as manganese dioxide, or under the conditions of an Oppenauer oxidation, that is to say by reaction with an excess of an aliphatic, alicyclic or araliphatic ketone, such as acetone, cyclohexanone or benzophenone, in the presence of a metal alcoholate, more especially of an alkali metal compound or aluminum compound of a lower aliphatic alcohol, such as isopropanol, tertiary butanol or tertiary amyl alcohol. Immediately thereafter, or simultaneously, an oxygen function which may be present in position 3 can then be converted into a free oxo group.

From such products of the present process as contain in position 6 of the steroid skeleton an oxo group, $\Delta^{5(6)}$-19-norsteroids may be formed according to Wolff-Kishner by treatment with hydrazine and alkali metal hydroxides at an elevated temperature with elimination of the 6-oxo group and simultaneous shifting of the double bond, the resulting product being free from undesirable isomers. A resulting compound that is substituted in position 3 by an oxygen function, for example a free or esterified hydroxyl group, or a ketalised oxo group, can be converted, after formation of a free 3-oxo group, into one of the known pharmacologically active $\Delta^3$-3-oxo-19-norsteroids.

In resulting compounds that contain a $\Delta^{5(10)}$-double bond this bond may be epoxidised, likewise in known manner, for example by treatment with a per-acid, such as perbenzoic acid or monoperphthalic acid, and in this manner a new, valuable type of 19-nor compounds, namely the 5:10-oxido-6-oxo- or -6-hydroxysteroids and the esters or ethers of the latter, are obtained.

When a product of the invention contains ketal groups, for example in position(s) 3 and/or 17 or 20, they can be hydrolysed singly or together by treatment with an acidic agent.

The invention includes also any modification of the process in which an intermediate obtained at any stage of the process is used as starting material and any remaining step(s) is/are carried out or the process is discontinued at any stage thereof, or in which a starting material is formed under the reaction conditions or is used in the form of one of its functional derivatives.

As starting materials for use in the present process there are suitable Δ⁵-19-hydroxysteroids, for example of the androstane, pregnane, cholane, cholestane, spirostane or cardanolide series, which may contain in one or more than one of positions 2, 3, 4, 7, 11, 12, 14, 15, 16, 17, 20, 21 and in the side-chain further substituents, for example alkyl groups such as methyl, halogen atoms, functionally converted (that is to say esterified or etherified) hydroxyl groups and/or free, and primarily protected (that is to say, for example ketalised or enolised) oxo groups. The compounds may also contain one or more than one double bond, more especially in ring D and in the side-chain, and/or oxido groups.

Particularly suitable starting materials are

Δ⁵-19-hydroxyandrostenes and -pregnenes, for example
Δ⁵-17-oxo-19-hydroxyandrostene,
Δ⁵-3β-acyloxy-17-oxo-19-hydroxyandrostenes and their 17-ethylenedioxy compounds,
Δ⁵-3β:17β-diacyloxy-19-hydroxyandrostenes,
Δ⁵-3:17-dioxo-19-hydroxyandrostene and its 3:17-bisethylenedioxy compound,
Δ⁵-3β:17β-diacyloxy-17α-alkyl- and -17α-alkenyl-19-hydroxyandrostenes such as 3β:17β-diacyloxy-17α-methyl-, -17α-ethyl-, 17α-vinyl-, or -17α-allyl-19-hydroxyandrostenes, and the corresponding 3-oxo-17α-acyloxy compounds or their 3-ethylene-ketals; also
Δ⁵-3:20-dioxo-19-hydroxypregnene and its 3:20-bisethylenedioxy compound,
Δ⁵-3β-acyloxy-19-hydroxy-20-oxopregnenes and their ethylenedioxy compounds,
Δ⁵-3β:20β-diacyloxy-19-hydroxypregnenes,
Δ⁵-3:20-bisethylenedioxy-16α-methyl-19-hydroxypregnene,
Δ⁵-3β:11α-20β-triacyloxy-19-hydroxypregnene, and
Δ⁵-3:20-bisethylenedioxy-11α- and -11β-acyloxy-19-hydroxypregnenes.

The above-mentioned starting materials can be prepared, for example, by ketalising Δ⁴-3-oxo-19-acyloxysteroids followed by alkaline hydrolysis of the 19-acyloxy group, or advantageosuly by the processes disclosed in Belgian Patents 606,179, 606,180, 606,181 and 606,182. According to said processes 5α-halogeno-, more especially 5α-bromo-6β:19-oxidosteroids, or Δ⁴-3-oxo-6β:19-oxido-steroids are treated with reducing agents, for example with zinc in glacial acetic acid, and the resulting Δ⁵-19-hydroxy or Δ⁵-3-oxo-19-hydroxy compounds are isolated.

In the afore-mentioned esters the acid residues are primarily those of aliphatic, cycloaliphatic, araliphatic, aromatic or heterocyclic carboxylic acids, preferably such as contain 1 to 15 carbon atoms, such as formic, methylcarbonic, ethylcarbonic acetic, trifluoroacetic, propionic, butyric, valeric, trimethylacetic, caproic, oenanthic, decanoic, hexahydrobenzoic, cyclopentylpropionic, phenylpropionic, benzoic or furancarboxylic acid.

From among the resulting Δ⁴-3-oxo-19-norsteroids special use is made of the compounds of the androstane and pregnane series, such, for example, as 19-nortestesterone and its derivatives substituted in position 17 by saturated or unsaturated hydrocarbon residues, as well as of esters of these compounds or 19-norprogesterone and its 17-acyloxy derivatives, as anabolic, androgenic, progestative or ovulation inhibiting medicaments.

Products of the present process that contain a $\Delta^{5(10)}$-3:6-dioxo grouping and belong to the 17β-hydroxyandrostane series are likewise biologically active as stated in British Patent 596,866.

In $\Delta^{5(6)}$-19-norsteroids the Δ⁵-double bond can be epoxidised, for example with organic per-acids, and resulting 5α:6-epoxides can be split with Grignard compounds or hydrohalic acids to yield 6β-substituted 5α-hydroxysteroids; the latter, after formation of an oxo group in position 3 and elimination of water, can be converted into Δ⁴-3-oxo-6β-alkylsteroids or -6β-halogeno-19-norsteroids which can be isomerised in known manner to the Δ⁴-3-oxo-6α-alkylsteroids or -halogen-19-norsteroids which display the actions referred to above.

Products of the present process that contain in position 6 a hydroxyl or acyloxy group are also suitable for the manufacture of $\Delta^{5(10);6}$-19-norsteroid dienes of which primarily the representatives of the 3-oxopregnane series, such as $\Delta^{5(10);6}$-3:20-dioxo-17α-acetoxy-19-norpregnadiene, display a progestative action which is superior to that of progesterone and 19-norprogesterone (U.S. patent specification Serial No. 208,634, filed July 9, 1962, by Albert Wettstein et al.).

The conversion of the $\Delta^{5(10)}$-6-hydroxy-19-norsteroids and of their esters into the afore-mentioned $\Delta^{5(10);6}$-19-nor-compounds is likewise performed in known manner, for example by thermal elimination of 1 molecular proportion of water or acid, catalysed by means of a base or an acid.

The following examples illustrate the invention.

*Example 1*

3.25 g. of lead tetraacetate are dried for 2½ hours in a high vacuum at room temperature, then mixed with 3.25 g. of calcium carbonate and 175 cc. of absolute benzene and heated at the boil for a short time. After cooling there are added 3.25 g. of Δ⁵-3:17-bisethylenedioxy-19-hydroxyandrostene in the solid state, and the mixture is heated and stirred for 6 hours, then left to itself overnight at room temperature and processed in the usual manner. The resulting oil (3.5 g.) is unitary according to its thin-layer chromatogram (eluant: benzene+methanol (9:1); silica gel G "Merck"). Infrared spectrum in chloroform: $\nu_{max}$=1725, 1245 cm.⁻¹.

Hydrolysis of the above crude product in 250 cc. of methanolic potassium hydroxide solution of 5% strength at the boil for 1 hour furnishes 3.35 g. of crystals which are dissolved in ether and filtered through basic alumina (activity III). When these crystals are recrystallised once from acetone+petroleum ether, they yield 2.71 g. of $\Delta^{5(10)}$-3:17-diethylenedioxy-6ε-hydroxy-19-norandrostene melting at 150–152° C. An analytically pure product obtained by three recrystallisations has a constant melting point of 157–158° C. Optical rotation $[\alpha]_D$=+73° (c.=0.92). Infrared spectrum in chloroform: $\nu_{max}$=3610 cm.⁻¹.

The Δ⁵-3:17-bisethylenedioxy-19-hydroxyandrostene used as starting material may be prepared as follows:

8.6 g. of Δ⁴-3:17-dioxo-19-hydroxyandrostene are acetylated in 100 cc. of a 1:1-mixture of acetic anhydride and pyridine overnight at room temperature. The reaction solution is evaporated under vacuum, the residue is dissolved in benzene and the solution is filtered through neutral alumina (activity II).

The resulting oily O-acetyl derivative is ketalised in 500 cc. of benzene and 50 cc. of ethylene glycol in the presence of 500 mg. of para-toluenesulphonic acid in a water separator with stirring at the boil. After 22 hours' reaction the cooled mixture is poured over ice, extracted with ether and the organic phase is washed with sodium bicarbonate solution and much water.

The resulting oily crude product is hydrolysed as it is in 400 cc. of methanolic potassium hydroxide solution of 5% strength at the boil. After 1 hour water is dropped into the hot solution until crystallisation sets in. The resulting crystals are dissolved in ethyl acetate and the solution is filtered through basic alumina (activity II). When the filter residue is crystallised once from acetone+petroleum ether, it yields 6.8 g. of Δ⁵-3:17-bisethylenedioxy-19-hydroxyandrostene melting at 199–200° C. Optical rotation $[\alpha]_D$=−59° (c.=1.20). Infrared spectrum in chloroform: $\nu_{max}$=about 3600 cm.⁻¹.

In an analogous manner 1.5 g. of Δ⁵-3:20-bisethylenedioxy-19-hydroxypregnene give 1.0 g. of crude $\Delta^{5(10)}$-3:20-bisethylenedioxy-6ε-hydroxy-19-norpregnene which can be purified by chromatography.

Example 2

A suspension of 3.0 g. of previously dried lead tetraacetate and 2.0 g. of barium carbonate in cyclohexane is boiled for a short time, then 2.0 g. of $\Delta^5$-3$\beta$:17$\beta$-diacetoxy-19-hydroxyandrostene melting at 148–149° C. are added, and the mixture is stirred and refluxed for 8 hours and cooled. The inorganic constituents are filtered off, the solution is evaporated under vacuum, the residue is dissolved as it is in 100 cc. of a 3:1-mixture of methanol and water, 2.0 g. of potassium carbonate are added, and the whole is refluxed for 2 hours. The crude $\Delta^{5(10)}$-3$\beta$:6:17$\beta$-trihydroxy-19-norandrostene precipitated by addition of water (1.40 g.) is dissolved in 50 cc. of acetone and oxidised for 1 hour at 0° C. with 2 cc. of 8N-chromium trioxide solution in sulphuric acid. After processing and crystallisation from acetone+petroleum ether there are obtained 980 mg. of $\Delta^{5(10)}$-3:6:17-trioxo-19-norandrostene melting at 163° C. Optical rotation $[\alpha]_D^{25} = +219°$ (c.=0.63).

An analogous treatment of $\Delta^5$-3$\beta$:20$\beta$-diacetoxy-19-hydroxypregnene gives a yield of about 50% of $\Delta^{5(10)}$-3:6:20-trioxo-19-norpregnene. Ultraviolet spectrum: $\lambda_{max}$ 249 m$\mu$ ($\epsilon$=10,000).

Example 3

2.715 g. of $\Delta^{5(10)}$-3:17-bisethylenedioxy-6-hydroxy-19-norandrostene are added to 46 cc. of a chloroform solution containing 2.37 g. of perbenzoic acid; the batch is kept overnight at 4° C., then diluted with ether, poured over ice, and the organic phase is successively washed with potassium iodide and sodium thiosulphate solution water, sodium bicarbonate solution and again with water, to give a crude product which is chromatographed on neutral alumina (activity II). Elution with benzene and with a 1:1-mixture of benzene+ether produces 1.763 g. of 3:17-bis-ethylenedioxy-5:10-oxido-6-hydroxy-19-norandrostane which, after recrystallisation from acetone+petroleum ether, has a constant melting point of 133° C. (1.336 g.). Optical rotation $[\alpha]_D = +12°$ (c.=1.33). Infrared spectrum in chloroform: $\nu_{max}$=3580 cm.$^{-1}$.

Example 4

245 mg. of 3:17 - bisethylenedioxy - 5:10 - oxido - 6 - hydroxy - 19 - norandrostane are dissolved in a small amount of pyridine and dropped into a suspension of 250 mg. of chromium trioxide in 1 cc. of pyridine. The mixture is kept overnight at room temperature and then processed in the usual manner, to yield 227 mg. of 3:17-bisethylenedioxy - 5:10 - oxido - 6 - oxo - 19 - norandrostane which, after two recrystallisations from acetone+petroleum ether, melts at 137–138° C. Optical rotation $[\alpha]_D = -94°$ (c.=1.14). Infrared spectrum in chloroform: $\nu_{max}$=1700 cm.$^{-1}$.

Example 5

A solution of 200 mg. of $\Delta^{5(10)}$ - 3:17 - bisethylenedioxy - 6 - hydroxy - 19 - norandrostene in 40 cc. of absolute benzene and 4 cc. of absolute acetone is mixed with 500 mg. of aluminium isopropylate and the whole is stirred and refluxed for 16 hours. Usual processing yields 197 mg. of a crystalline crude product which is dissolved in a 9:1-mixture of benzene+ether and filtered through basic alumina (activity II), to yield 160 mg. of $\Delta^{5(10)}$-3:17 - bisethylenedioxy - 6 - oxo - 19 - norandrostene which, after two crystallisations from acetone+petroleum ether, has a constant melting point of 178–180° C. Optical rotation $[\alpha]_D = +43°$ (c.=0.94). Infrared spectrum in chloroform: $\nu_{max}$=1657, 1619 cm.$^{-1}$. Ultraviolet spectrum: $\lambda_{max}$=249 m$\mu$ ($\epsilon$=11,900).

Example 6

A solution of 470 mg. of $\Delta^{5(10)}$ - 3:17 - bisethylenedioxy - 6 - oxo - 19 - norandrostene in 15 cc. of acetic acid, 15 cc. of methanol and 7 drops of water is heated for 1 hour at 60° C. There are obtained 490 mg. of an amorphous crude product which is purified by filtration through neutral alumina (activity III) in a benzene+ether 1:1-solution, to yield 406 mg. of crystalline $\Delta^{5(10)}$-3-ethylenedioxy - 6:17 - dioxo - 19 - norandrostene; after three recrystallisations from acetone+petroleum ether it melts at 189–190° C. Optical rotation $[\alpha]_D = +167°$ (c.=0.63). Infrared spectrum in chloroform: $\nu_{max}$=1736, 1660, 1620 cm.$^{-1}$. Ultraviolet spectrum: $\lambda_{max}$=249 m$\mu$ ($\epsilon$=11,300).

Example 7

$\Delta^{5(10)}$ - 3 - ethylenedioxy - 6:17 - dioxo - 19 - norandrostene is heated in 10 cc. of glacial acetic acid for 1 hour at the boil and then evaporated under vacuum. Chromatography on neutral alumina (activity III) with benzene and a 9:1-mixture of benzene+ether furnishes 136 mg. of a product which after three recrystallisations from acetone+petroleum ether melts constantly at 163° C. and is identical with the compound described in Example 2. Infrared spectrum in chloroform: $\nu_{max}$=1735, 1673, 1628 cm.$^{-1}$. Ultraviolet spectrum: $\lambda_{max}$=249 m$\mu$ ($\epsilon$=9650).

Example 8

A solution of 1 g. of $\Delta^{5(10)}$ - 3:17 - bisethylenedioxy-6-oxo-19-norandrostene in 10 cc. of ethanol, 31 cc. of diethylene glycol and 10 cc. of hydrazine hydrate is heated for 1½ hours at the boil, then cooled, and 5 g. of crushed potassium hydroxide are added. On further heating for 30 minutes at the reflux temperature (100° C.), another 60 cc. of diethylene glycol are added and the explusion of ethanol is continued until the boiling temperature of the reaction solution has reached 190° C. After boiling for 3¼ hours the batch is cooled and worked up as usual. The resulting crude product is chromatographed on basic alumina (activity II).

A 1:1-mixture of petroleum ether and benzene, and then benzene, elute 483 mg. of $\Delta^5$ - 3:17 - bisethylenedioxy-19-norandrostene melting at 135–137° C. after two recrystallisations from acetone+petroleum ether. Optical rotation $[\alpha]_D = -196°$ (c.=1.49). Infrared spectrum in chloroform: no bands above 3100 cm.$^{-1}$ and between 1500 and 2800 cm.$^{-1}$.

A mixture of 40 mg. of $\Delta^5$ - 3:17 - bisethylenedioxy-19-norandrostene, 6 cc. of glacial acetic acid and 10 drops of water is heated for 1 hour at the boil, and the solution is then evaporated under vacuum. The residue is dissolved in ether and the solution is filtered through neutral alumina (activity II) to yield 20 mg. of crystals which after two recrystallisations from acetone+petroleum ether melt at 163–164° C. According to the mixed melting point test, infrared spectrum and thin-layer chromatogram (silica gel G "Merck"; eluant benzene+methanol 19:1) the product is identical with $\Delta^4$-3:17-dioxo-19-norandrostene.

What we claim is:

1. Process for the manufacture of $\Delta^{5(10)}$-6-hydroxy-19-nor-steroids of the androstane, pregnane, cholane, cholestane, spirostane and cardanolide series, wherein corresponding $\Delta^5$-19-hydroxy-steroids are reacted with an acylate of tetravalent lead and the reaction product is treated with an alkaline agent.

2. Process according to claim 1, wherein the reaction with the lead acylate is carried out in the presence of a weak base.

3. Process as claimed in claim 2, wherein a member selected from the group consisting of an alkaline earth metal carbonate, and a tertiary organic base is used as weak base.

4. Process according to claim 1, wherein the reaction with the lead acylate is carried out in the presence of a member selected from the group consisting of an aliphatic, cycloaliphatic and aromatic hydrocarbon.

5. Process as claimed in claim 4, wherein a member selected from the group consisting of benzene and cyclohexane is used.

6. Process as claimed in claim 1, wherein lead tetraacetate is used as lead acylate.

7. Process as claimed in claim 1, wherein there is used as alkaline agent the aqueous solution of a member selected from the group consisting of the bicarbonate, carbonate and hydroxide of an alkali and alkaline earth metal.

8. Process as claimed in claim 1, wherein $\Delta^5$-3-ketals of 19-hydroxyandrostenes are used as starting material.

9. Process as claimed in claim 1, wherein $\Delta^5$-3-ketals of 19-hydroxypregnenes are used as starting material.

10. Process as claimed in claim 1, wherein $\Delta^5$-3-carboxylic acid esters of 19-hydroxyandrostenes are used as starting material.

11. Process as claimed in claim 1, wherein $\Delta^5$-3-carboxylic acid esters of 19-hydroxypregnenes are used as starting material.

12. A compound of the formula

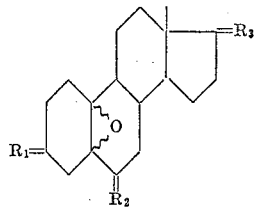

in which $R_1$ stands for a member selected from the group consisting of

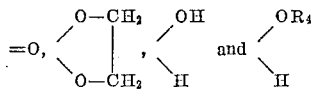

$R_2$ for a member selected from the group consisting of

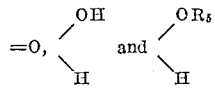

and $R_3$ for a member selected from the group consisting of $$=O, \quad \begin{matrix} O-CH_2 \\ | \\ O-CH_2 \end{matrix}, \quad \begin{matrix} OH \\ / \\ \backslash H \end{matrix}, \quad \begin{matrix} OR_6 \\ / \\ \backslash H \end{matrix}, \quad \begin{matrix} OH \\ / \\ \backslash \text{lower alkyl} \end{matrix} \text{ and } \begin{matrix} OR_6 \\ / \\ \backslash \text{lower alkyl} \end{matrix}$$

where each of $R_4$, $R_5$ and $R_6$ represents the acyl radical of a carboxylic acid having up to 15 carbon atoms.

13. A compound of the formula

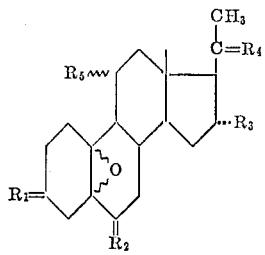

in which $R_1$ and $R_4$ each stands for a member selected from the group consisting of

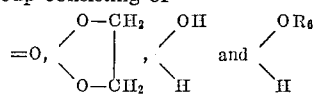

$R_2$ for a member selected from the group consisting of

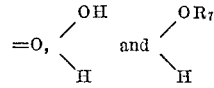

$R_3$ for a member selected from the group consisting of —H and —CH$_3$ and $R_5$ for a member selected from the group consisting of —H, —OH and —OR$_8$, where each of $R_6$, $R_7$ and $R_8$ represents the acyl radical of a carboxylic acid having up to 15 carbon atoms.

14. 3:17-bisethylenedioxy-5:10-oxido-6 - hydroxy - 19-norandrostane.

15. 3:17-bisethylenedioxy-5:10-oxido-6-oxo-19 - norandrostane.

References Cited by the Examiner

Amorosa et al.: Helv. Chim. Acta, vol. XLV, pp. 2674–98, December 1962.

LEWIS GOTTS, *Primary Examiner.*